United States Patent
Maes

(10) Patent No.: US 8,560,463 B2
(45) Date of Patent: Oct. 15, 2013

(54) TECHNIQUES FOR CORRELATION OF CHARGES IN MULTIPLE LAYERS FOR CONTENT AND SERVICE DELIVERY

(75) Inventor: Stephane H. Maes, Fremont, CA (US)

(73) Assignee: Oracle International Corporation, Redwood Shores, CA (US)

( * ) Notice: Subject to any disclaimer, the term of this patent is extended or adjusted under 35 U.S.C. 154(b) by 892 days.

(21) Appl. No.: 11/475,280

(22) Filed: Jun. 26, 2006

(65) Prior Publication Data

US 2007/0297340 A1   Dec. 27, 2007

(51) Int. Cl.
| | |
|---|---|
| *G06F 17/00* | (2006.01) |
| *G06G 7/00* | (2006.01) |
| *G06Q 10/00* | (2012.01) |
| *G07B 17/00* | (2006.01) |
| *G07F 19/00* | (2006.01) |

(52) U.S. Cl.
USPC ............... 705/400; 705/1.1; 705/30; 705/304

(58) Field of Classification Search
USPC .......... 705/1.1, 7.11–7.36, 400–412, 30, 304; 709/201
See application file for complete search history.

(56) References Cited

U.S. PATENT DOCUMENTS

| | | |
|---|---|---|
| 4,996,642 A | 2/1991 | Hey |
| 6,240,401 B1 | 5/2001 | Oren et al. |
| 6,308,328 B1 | 10/2001 | Bowcutt et al. |
| 6,334,127 B1 | 12/2001 | Bieganski et al. |
| 6,438,579 B1 | 8/2002 | Hosken |
| 6,546,555 B1 | 4/2003 | Hjelsvoid et al. |
| 6,567,657 B1 | 5/2003 | Holly et al. |
| 6,601,061 B1 | 7/2003 | Holt et al. |
| 6,665,659 B1 | 12/2003 | Logan |
| 6,732,366 B1 | 5/2004 | Russo |
| 6,769,127 B1 | 7/2004 | Bonomi et al. |
| 6,847,969 B1 | 1/2005 | Mathai et al. |
| 6,854,010 B1 | 2/2005 | Christian et al. |
| 6,892,228 B1 | 5/2005 | Penders |

(Continued)

FOREIGN PATENT DOCUMENTS

WO     WO 2005006228 A2 *  1/2005

OTHER PUBLICATIONS

Author Unknown, "Using RTSP With Firewalls, Proxies, and Other Intermediary Network Devices", Version 2.0/rev. 2, 1998, http://docs.real.com/docs/proxykit/rtspd.pdf, 16 pages.

(Continued)

*Primary Examiner* — George Chen
(74) *Attorney, Agent, or Firm* — Kilpatrick Townsend & Stockton LLP

(57) ABSTRACT

In a method for correlating charges in a service layer and a network layer, first charging data is determined for a service layer based on content or a service purchased for a user. Second charging data for a network layer is determined based on transmission for the content or service. The first and second charging data, with any respective metadata, are correlated in order to generate a single bill for the user. This bill may be for the transmission as well as the purchase of the content or service. In the correlation, charges for the network layer and/or the service layer may be changed based on the correlation. For example, duplicative charges such as charging for the content and the traffic used to download the content may be correlated and one of the charges may be changed or removed.

14 Claims, 5 Drawing Sheets

(56) References Cited

U.S. PATENT DOCUMENTS

| | | |
|---|---|---|
| 7,149,797 B1 | 12/2006 | Weller et al. |
| 7,181,523 B2 | 2/2007 | Sim |
| 7,197,570 B2 | 3/2007 | Eylon et al. |
| 7,233,790 B2 | 6/2007 | Kjelberg et al. |
| 7,272,651 B1 | 9/2007 | Bolding et al. |
| 7,360,210 B1 | 4/2008 | Vacanti et al. |
| 7,363,384 B2 | 4/2008 | Chatani et al. |
| 7,366,495 B1 | 4/2008 | Magnotta et al. |
| 7,386,623 B2 | 6/2008 | Nishimura et al. |
| 7,783,635 B2 | 8/2010 | Maes |
| 7,917,612 B2 | 3/2011 | Maes |
| 2001/0027558 A1 | 10/2001 | Sasselli et al. |
| 2002/0022453 A1 | 2/2002 | Balog et al. |
| 2002/0042923 A1 | 4/2002 | Asmussen et al. |
| 2002/0056126 A1 | 5/2002 | Srikantan et al. |
| 2002/0083124 A1 | 6/2002 | Knox et al. |
| 2002/0116291 A1 | 8/2002 | Grasso et al. |
| 2002/0124182 A1 | 9/2002 | Bacso et al. |
| 2002/0128984 A1 | 9/2002 | Mehta et al. |
| 2002/0143565 A1 | 10/2002 | Headings et al. |
| 2002/0152224 A1 | 10/2002 | Roth et al. |
| 2002/0152305 A1 | 10/2002 | Jackson et al. |
| 2002/0184195 A1 | 12/2002 | Qian |
| 2002/0194251 A1 | 12/2002 | Richter et al. |
| 2003/0028884 A1 | 2/2003 | Swart et al. |
| 2003/0028890 A1 | 2/2003 | Swart et al. |
| 2003/0061611 A1 | 3/2003 | Pendakur |
| 2003/0093341 A1 | 5/2003 | Millard et al. |
| 2003/0093799 A1 | 5/2003 | Kauffman et al. |
| 2003/0145333 A1 | 7/2003 | Hjelsvold et al. |
| 2003/0154487 A1 | 8/2003 | Tsumura |
| 2003/0187794 A1* | 10/2003 | Irwin et al. ............... 705/40 |
| 2003/0233241 A1 | 12/2003 | Marsh |
| 2003/0236745 A1 | 12/2003 | Hartsell et al. |
| 2003/0236905 A1 | 12/2003 | Choi et al. |
| 2004/0008688 A1 | 1/2004 | Matsubara et al. |
| 2004/0025186 A1 | 2/2004 | Jennings et al. |
| 2004/0028055 A1 | 2/2004 | Madour et al. |
| 2004/0044677 A1 | 3/2004 | Huper-Graff et al. |
| 2004/0064579 A1 | 4/2004 | Jennings |
| 2004/0102182 A1 | 5/2004 | Reith et al. |
| 2004/0117500 A1 | 6/2004 | Lindholm et al. |
| 2004/0117836 A1 | 6/2004 | Karaoguz et al. |
| 2004/0133923 A1 | 7/2004 | Watson et al. |
| 2004/0167791 A1* | 8/2004 | Rodrigo et al. ............... 705/1 |
| 2004/0192253 A1 | 9/2004 | Usumi |
| 2004/0205043 A1 | 10/2004 | Alessi et al. |
| 2004/0267812 A1 | 12/2004 | Harris et al. |
| 2005/0009500 A1 | 1/2005 | Ear |
| 2005/0009541 A1 | 1/2005 | Ye et al. |
| 2005/0021765 A1 | 1/2005 | Flores et al. |
| 2005/0022229 A1 | 1/2005 | Gabriel et al. |
| 2005/0064875 A1 | 3/2005 | Gonsalves et al. |
| 2005/0076365 A1 | 4/2005 | Popov et al. |
| 2005/0154764 A1 | 7/2005 | Riegler et al. |
| 2005/0198332 A1 | 9/2005 | Laertz et al. |
| 2005/0246282 A1 | 11/2005 | Naslund et al. |
| 2005/0283791 A1 | 12/2005 | McCarthy et al. |
| 2006/0090187 A1 | 4/2006 | Chae et al. |
| 2006/0100987 A1 | 5/2006 | Leurs |
| 2006/0111077 A1* | 5/2006 | Hurtta ............... 455/406 |
| 2006/0141984 A1 | 6/2006 | Taglienti et al. |
| 2006/0153160 A1 | 7/2006 | Kalland et al. |
| 2006/0168288 A1 | 7/2006 | Covell et al. |
| 2006/0206617 A1 | 9/2006 | Rey et al. |
| 2006/0230124 A1 | 10/2006 | Belfiore et al. |
| 2006/0242038 A1* | 10/2006 | Giudilli ............... 705/35 |
| 2006/0271488 A1 | 11/2006 | Maes |
| 2006/0271548 A1 | 11/2006 | Maes |
| 2006/0272028 A1 | 11/2006 | Maes |
| 2006/0272031 A1 | 11/2006 | Ache et al. |
| 2008/0215704 A1 | 9/2008 | Curcio et al. |

OTHER PUBLICATIONS

Boll, Susanne, "Modular Content Personalization Service Architecture for E-Commerce Applications", Proceedings of the 4th IEEE International Workshop on Advanced Issues of E-Commerce and Web-Based Information Systems, 2002, 8 pages.

Karjoth, Gunter, "Access Control with IBM Tivoli Access Manager", IBM Research, Zurich Research Laboratory, ACM Transactions on Information and System Security, vol. 6, No. 2, May 2003, pp. 232-257.

Kuo, Y.-F. et al., "Personalization technology application to Internet content provider," *Expert Systems with Applications*, 2001, vol. 21, pp. 203-215.

Schulzrinne, H. et al., "Real Time Streaming Protocol (RTSP)," Network Working Group, Request for Comments: 2326, Category: Standard Track, Apr. 1998, 115 pages.

Van Setten, Mark et al., "Context-Aware Recommendations in the Mobile Tourist Application COMPASS", AH 2004, LNCS3137, pp. 235-244, 2004.

RealNetworks, Inc., Using RTSP with Firewalls, Proxies, and Other Intermediary Network Devices, Version 2.0/rev.2, http:/docs.real.com/docs/proxykit/rtspd.pdf, 1998, 16 pages.

U.S. Appl. No. 11/138,844, filed May 25, 2005, Notice of Allowance mailed Sep. 18, 2012, 4 pages.

Kallio, Paivi et al. "Accounting and Billing of Wireless Internet Services in the Third Generation Networks", 2003.

U.S. Appl. No. 11/138,844, filed May 25, 2005, Final Office Action dated Dec. 2, 2011, 15 pages.

U.S. Appl. No. 11/138,844, filed May 25, 2005, Office Action dated Jul. 15, 2011, 14 pages.

* cited by examiner

TECHNIQUES FOR CORRELATION OF CHARGES IN MULTIPLE LAYERS FOR CONTENT AND SERVICE DELIVERY

BACKGROUND OF THE INVENTION

Embodiments in accordance with the present invention generally relate to telecommunications and more specifically to correlating charges across multiple layers.

Users of various networks and network-compatible devices are increasingly able to purchase or otherwise access a variety of content and services for a fee. For example, a user can download purchased content to a device for playing, viewing, or other such purpose. A user also can use a service, such as to send a message or access a location, whether the use is driven by a subscriber, a third party, or an application or process. Typically, the user incurs costs relating to the fee of the content or service, as well as traffic or network costs for downloading the content or accessing data, voice, or other information provided by or used for the service through a network. In one example, a song can be purchased from an online music store for 0.99 cents. The song then can be downloaded to a network-compatible device, such as a cellular phone or PDA. The user of the device typically is charged by the network provider for each kilobyte transferred across the network. The user is thus charged twice, once by the online music store and another time by the network provider. Also, the traffic costs may be amplified if multiple attempts to download or access the content are required because of network failures or any other problems.

This method of charging can cause problems, as users typically do not want to be responsible for the multiple traffic charges that are incurred when downloads fail. The traffic charges being billed in addition to the price for the content itself also is undesirable. Since the provider of the content or service delivery system and the provider for the network are often different entities, however, these providers typically bill their customers separately and do not provide the ability for a single total fee to be charged for the particular content or service. Charging takes place at the service level then again for data traffic at the network level, and can occur again at the network level if the original download or access did not complete. Thus, users often are charged multiple times for content and services when in actuality the users only wish to purchase a single service instance or item content having a single fee associated therewith.

Further, in a network where traffic is controlled at the service level, such as by a Session Initiation Protocol (SIP) signaling application or a Real-Time Streaming Protocol (RTSP) application, the network service provider might still want to be able to charge for usage, such as by packet or traffic level, instead of simply based on a duration or period of usage, or a flat fee. As signaling typically is in a different layer than various media exchanges, this typically is not possible without separate specific transport or network level charging.

BRIEF SUMMARY OF THE INVENTION

Embodiments in accordance with the present invention generally relate to a correlation of charges across multiple layers. "Correlation" as used herein refers to the relating of service level activities with network (traffic) events, particularly for a single transaction or activity requested by, or delivered to, a subscriber (or any principal involved therein). "Charge correlation" refers to grouping together, as a single transaction charge, charges gathered at the service level for service level activities (e.g. buying content or requesting or using a service or enabler) and the charges at the network level for the correlated network activities, traffic, or events. Correlation also allows for the use of a single total transaction charge for applications such as credit and joint billing.

In one embodiment, a method for correlating charges in a service layer and a network layer is provided. First correlation information may be determined for a service layer based on content purchased by, or for, a user. Second correlation information for a network layer may be determined that is based on the transmission of content through the network layer. The first correlation information and second correlation information may be correlated in order to generate a bill for the user or other initiator. This bill may be for both the transmission of the content and the purchase of the content. In the correlation, charges for the network layer and/or the service layer may be changed based on the correlation. For example, duplicative charges such as charging for the content and the traffic used to download the content may be correlated and one of the charges may be changed or removed.

In another embodiment, a second method for correlating charges in a service layer and a network layer is provided. First correlation information may be determined for a service layer based on a service requested by, or for, a user. Second correlation information for a network layer may be determined that is based on the access to information or other event for the service through the network layer. The first correlation information and second correlation information may be correlated in order to generate a bill for the user or other initiator. This bill may be for both the access to the service and the purchase of the service. In the correlation, charges for the network layer and/or the service layer may be changed based on the correlation. For example, duplicative charges such as charging for the service and the traffic used to access the service may be correlated and one of the charges may be changed or removed.

In another embodiment, network charging data can be correlated with signaling data. A model for such correlation can treat signaling as any other service, and can correlate accordingly.

A further understanding of the nature and the advantages of the inventions disclosed herein may be realized by reference of the remaining portions of the specification and the attached drawings.

BRIEF DESCRIPTION OF THE DRAWINGS

Various embodiments in accordance with the present invention will be described with reference to the drawings, in which.

DETAILED DESCRIPTION OF THE INVENTION

Embodiments in accordance with the present invention can correlate multiple charges that may be incurred in multiple layers while performing functions such as downloading content, accessing services, and/or interacting with other applications, enablers, or resources. In one embodiment, the multiple layers include a service layer and a network layer. Although a service layer and network layer are described, it will be understood that any appropriate type(s) and number of independent layers can be correlated using such an approach.

In one embodiment, charges can be incurred when content is delivered using a content or service delivery platform. Such a delivery platform can be configured to allow a user to purchase content and/or services, and to allow for delivery of the content or access to the services. Billing and other functions also can be provided, such as through use of a charging enabler in the service layer. Other network charges can be incurred through the use of a network to download the content or access the service. The network charges and charges for the content delivery platform can be correlated. The correlated charges may then be changed as appropriate.

In one embodiment, charges can be incurred due to traffic, but the traffic in this embodiment is driven by service and/or signaling messages. Such an environment allows applications and services to drive calls, multimedia streaming, and exchanges. The charges then can be correlated with the signaling, which can be treated as a standard service. Correlation then can take place at the service level or at the network level, as for other embodiments.

A content or service delivery system also can be configured to allow a third party to purchase content or request a service for a user. In such a case, the user can be provided with access to the content or service, while the third party can receive a single correlated charge for the purchase. The correlated charges can be adjusted as appropriate.

Content Delivery Platform

Figure 1:
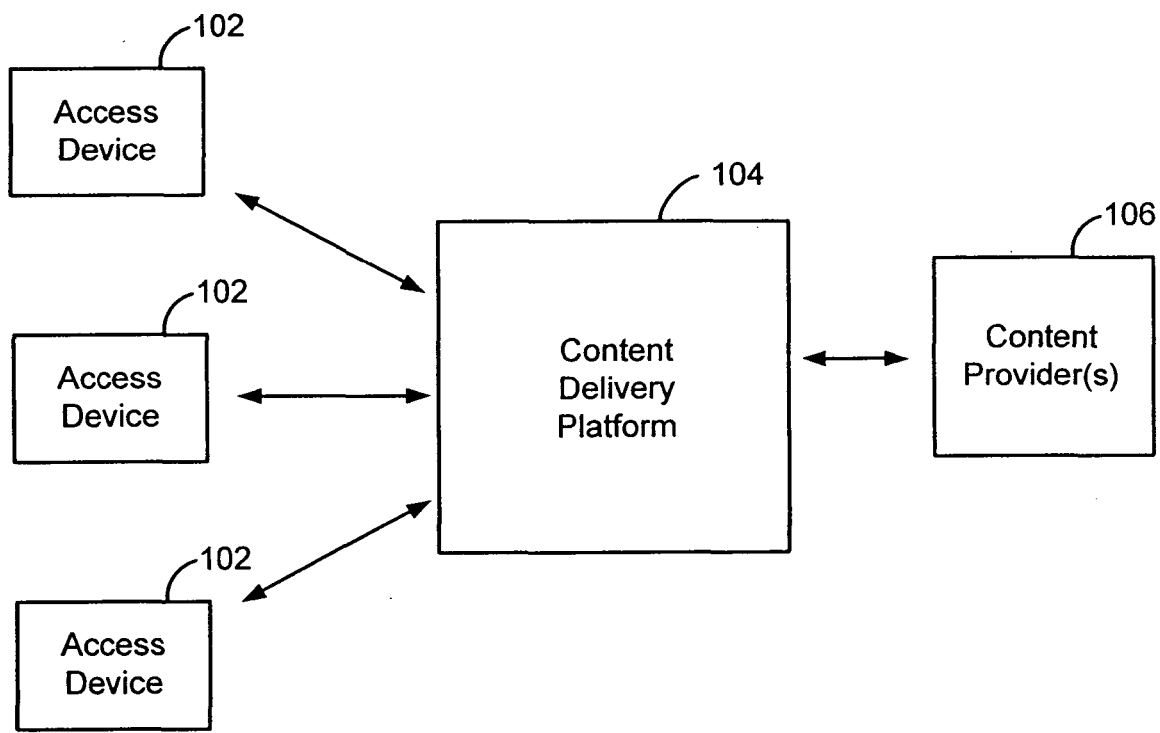
FIG. 1 depicts a system for managing content according to one embodiment of the present invention.

FIG. 1 depicts an exemplary system 100 for managing content according to one embodiment of the present invention. In one embodiment, the system 100 includes one or more access devices 102, such as cellular phones or portable media players, a content delivery platform 104, and at least one content provider 106. The access devices can communicate with the content delivery platform over an appropriate network, such as a cellular network or Internet connection as known in the art. Each content provider also can communicate with the content delivery platform over a network, which can be different from the network used by the access devices. Although an exemplary content delivery platform 104 is described, it will be understood that other content delivery platforms may be used. Further details of such a system 100 are provided in U.S. patent application Ser. No. 11/138,844, entitled "Platform and Service for Management and Multi-Channel Delivery of Multi-Types of Contents", filed on May 25, 2005, which is hereby incorporated herein by reference.

Access devices 102 can include any appropriate devices that can receive and/or send information through various access channels. An access channel is a channel in which information of a certain format or protocol may be received and/or sent. For example, the formats can include short message service (SMS), multimedia messaging service (MMS), voice, email, instant message (IM), facsimile, HyperText Transfer Protocol (HTTP), etc. In one example, content can be streamed through an appropriate data channel, while SMS messages can be sent through an SMS access channel. Also, MMS messages can be sent through an MMS access channel and HTTP messages may be sent through the Internet. Each access channel may require a different protocol or format in order to receive/send the information through the channel. Any of a number of other access mechanism can be used as known in the art.

Access devices 102 can include cellular phones, personal digital assistants (PDAs), personal computers, workstations, fax machines, plain old telephone service (POTS) telephones, etc. Access devices 102 can be configured to receive and/or send information through the various access channels. For example, content can be sent through a channel to the access devices 102.

A content delivery platform 104 can be configured to provide content to at least some of the access devices 102. Content can be provided from external sources 106 or from content stored locally to the content delivery platform 104. Examples of content include multimedia information, videos, data, television programs, audio information, etc. Content sources 106 can include any appropriate entities that can provide content through a content delivery platform 104. This can include, for example, providers of various multimedia formats, documents, files, or other appropriate objects.

The network(s) used to deliver content to the access devices can include any appropriate network configured to send and/or receive information from the access devices 102. In one embodiment, the network may be owned by a network provider. The network provider may be different from an entity that owns content delivery platform 104. Thus, different charges for the services that each provide may be generated.

Service Delivery Platform

Figure 2:
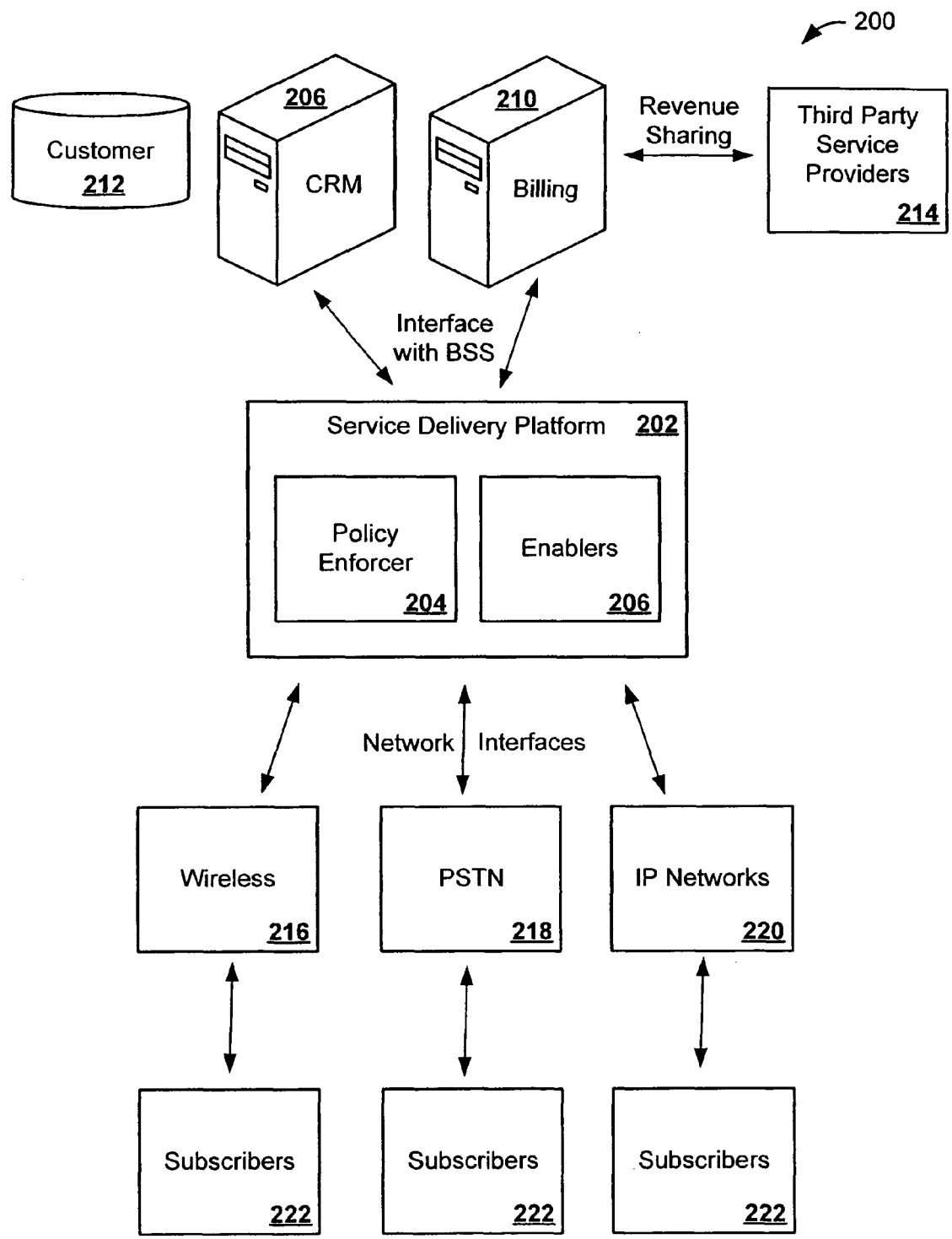
FIG. 2 depicts a system for delivering services according to one embodiment of the present invention.

FIG. 2 depicts an exemplary system 200 for managing services according to one embodiment of the present invention. In this embodiment, the system 200 includes a service delivery platform 202 such as will be discussed in detail later herein. The service delivery platform can include a policy enforcer 204 and at least one enabler 206. The service delivery platform 202 can communicate with business support systems (BSS) via at least one BSS interface as known in the art. The business support systems can include, for example, a customer relationship management (CRM) system 206, in contact with a customer database 212, as well as a billing system 210. The billing system and share revenue information with third party service providers 214, using an appropriate networking connection, as discussed later herein.

The service delivery platform 202 also can be in communication with any of a plurality of networks, such as wireless 216, PSTN 218, and IP networks 220, via appropriate network interfaces, such as STP, Parlay, and others. These interfaces allow the service delivery platform to provide services to the subscribers 222 through the appropriate networks.

Figure 3:
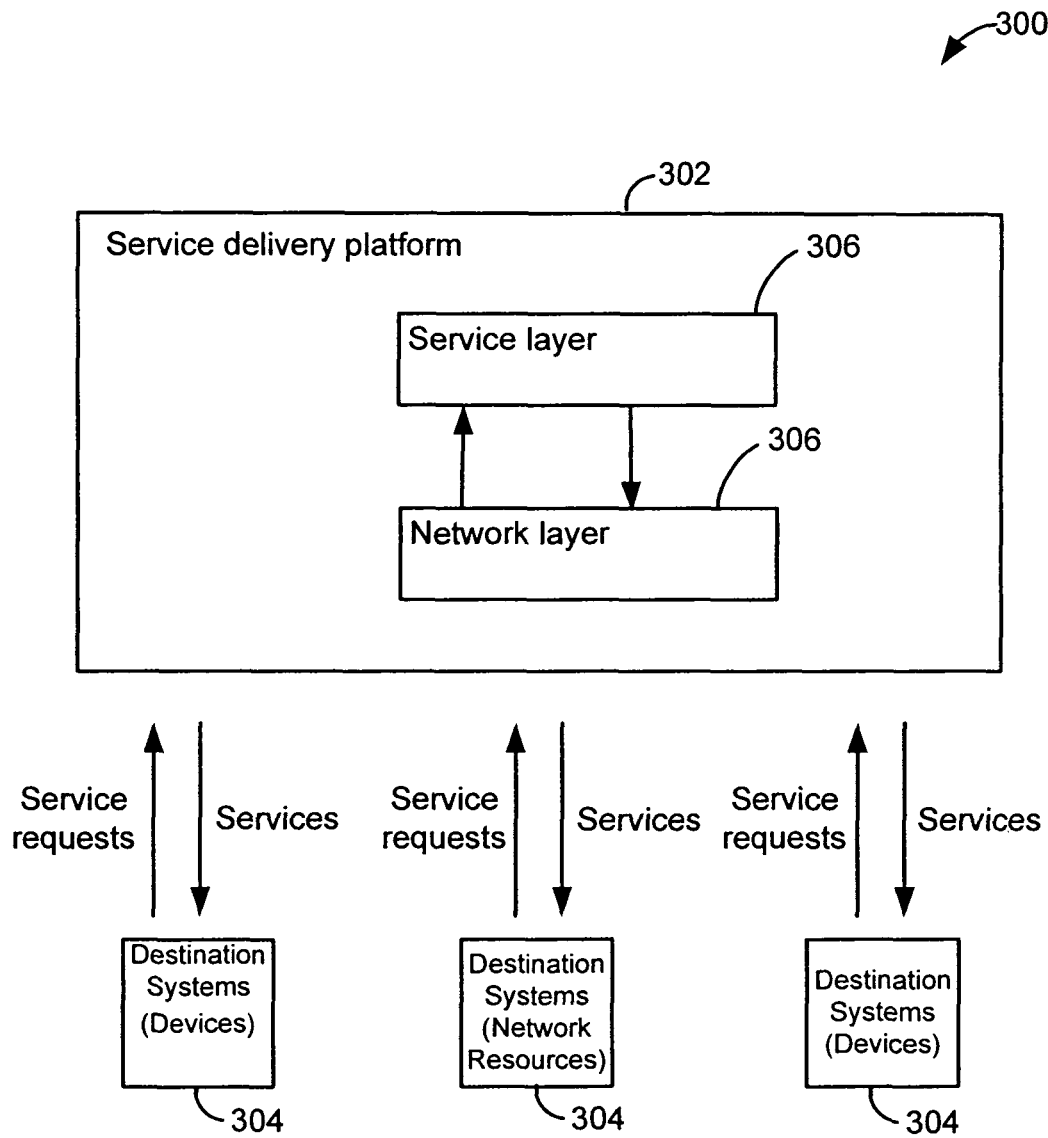
FIG. 3 depicts a content delivery system according to one embodiment of the present invention.

FIG. 3 shows an example of a service delivery system 300 that can be used in a configuration such as that of FIG. 2. A service delivery platform (SDP) 302 can be used to provide services to a variety of destination systems 304. Although various layers are described as being part of a service delivery platform (SDP), it will be understood that any number of layers may be provided in the SDP. For example, more or fewer layers may be added to the SDP than is described.

A service delivery platform 302 can be configured to provide any of a variety of services. Examples of such services include presence services, streaming media, call control services, content management, personalization, intelligent multi-channel messaging, notification, collaboration services, or any other services.

The services can be delivered to any of the various destination systems 304. Destination systems 304 may include any system or device that can request and/or receive a service. For example, destination systems 304 can include mobile devices, personal computers, personal digital assistants, blackberry devices, Goodlink devices, workstations, desktop computers, or any other appropriate electronic device.

Destination systems 304 also can include, for example, third party providers, applications, enterprises, and network resources. The resources that are exposed may be resources for the network layer, as well as for applications for other layers in SDP 102, or in other domains (third parties). Destination systems 304 may not be just devices, but can include other applications or systems within a domain or in another domain. A domain may be a domain for a third party.

The services may be exposed to third parties for their own usage. The third party may generate content or applications that can be made available to user on their network (e.g. internet and enterprise intranet) as well as on a public network. For example, a third party's mobile employees of a third party may use the services.

In order to provide the service, different functions may be performed. Each function may be broken up into separate layers that are concerned with certain functions. For example, a first function may perform the service (e.g., determine the location) and a second function may deliver the results of the performed services over many different networks (e.g., over different network protocols, channels and technologies, etc).

Thus, in one embodiment, SDP 302 includes a service layer 306 and a network layer 308. A layer provides a certain function with which that layer is concerned with performing. A second layer can be independent of the other layers, and can be concerned with performing a second function. Accordingly, the concerns of other layers can be factored out of a current layer. Although the layers are independent, the layers may use the result of a related layer when performing the functions provided by the current layer. However, the current layer is not concerned with how the result was determined.

Service layer 306 can be configured to provide a service, and may only be concerned with performing that service. For example, if a location service is being provided, service layer 306 performs the service of determining a location of a device. Service layer 306 is not concerned with functions of other layers, such as any network dependencies. For example, service layer 306 is not concerned with how a determined location will be sent to a destination system 304.

Network layer 308 is concerned with communicating the result of a performed service to a destination system 304. For example, any network dependencies for sending the result of the service are provided by network layer 308. In one embodiment, network layer 308 is configured to send the results of the services using a network protocol and channel to a destination system 304.

Network layer 308 can support service layer 306 and can rely on service layer 306 for the result of the service performed, but may not be concerned with the functions that are being performed by service layer 306. Conversely, service layer 306 can rely on network layer 308 to send a result but is not concerned with the functions that are being performed by network layer 308 to send the result. Accordingly, service layer 306 and network layer 308 can be separated by the functions with which the layers are concerned.

In one embodiment, SDP 302 may provide a location service. Service layer 306 is concerned with determining a location for a user. For example, service layer 306 may determine the location for a destination system 304 being used by a user. A request may be sent by service layer 306 to a location server, which can then determine the location. The location is then received by service layer 306. However, service layer 306 is not concerned with how the determined location will be sent to destination system 304 or to a network resource.

Further discussion of SDP systems can be found, for example, in U.S. patent application Ser. No. 11/357,653, entitled "Factorization of Concerns to Build a SDP (Service Delivery Platform)," filed Feb. 16, 2006, which is hereby incorporated herein by reference.

Correlation of Charges

Figure 4:
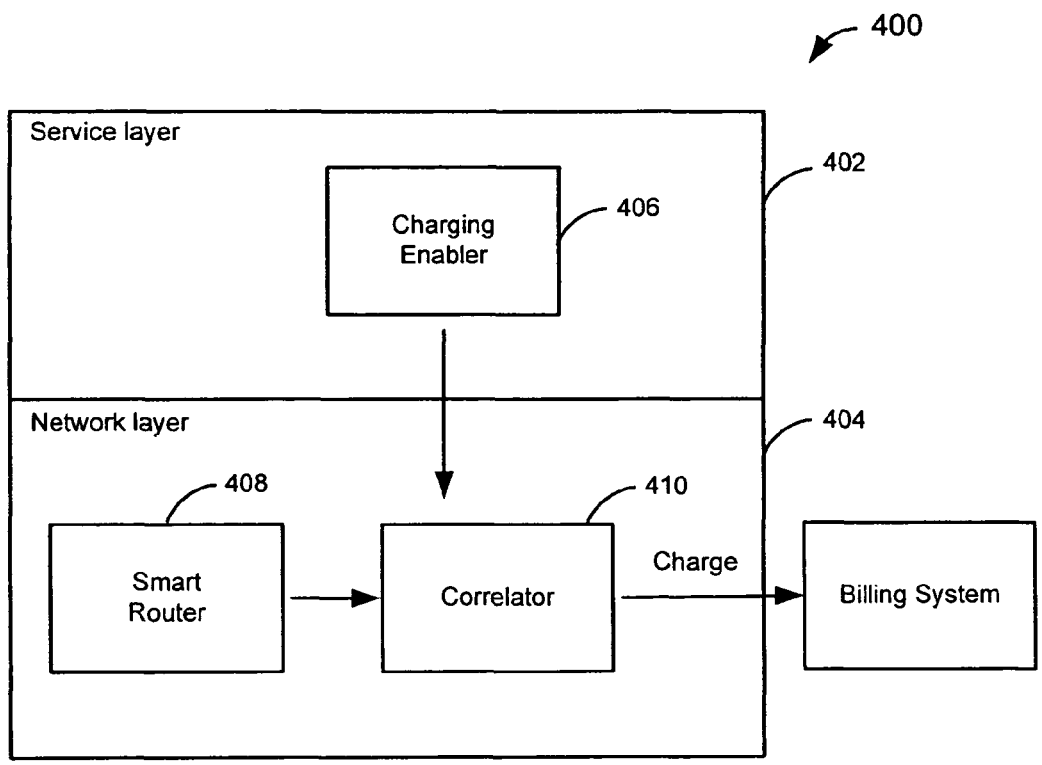
FIG. 4 depicts a system for providing correlation of charges in a network layer according to one embodiment of the present invention.

FIG. 4 depicts a system 400 for providing correlation of charges in a network layer according to one embodiment of the present invention. As shown, a service layer 402 and network layer 404 are provided. Embodiments of the present invention correlate charges that may be incurred in a service layer and a network layer. Although a service layer and network layer are described, it may be understood that any charges may be correlated.

Service layer 402 includes any components that are used for the purchase of content, or the usage of, or interaction with, a service or enabler. For example, service layer 402 may include a content delivery platform such as is described with respect to FIG. 1. Content may be any information that is purchased. For example, content may be multimedia information (e.g., movies, TV shows, commercials, video clips, etc.), emails, instant messages, voicemails, web sites, SMS messages, MMS messages, etc.

Network layer 404 can include any components involved in the transmission of the content to the client. For example, a telecommunications provider may provide transmission of the content and charges for the use of its network for transmitting the content. The network layer can be the infrastructure for the network, composed of network specific resources such as servers, routers, and transport mechanisms, as well as all associated backend OSS and BSS systems that support a network deployment. The service layer, on the other hand, can contain all aspects related to the development, deployment, and execution of applications and enablers that may rely on the underlying network infrastructure.

While charging can be allowed across layers, resources can be grouped in other ways than in such layers. In such a case, a charging system can be associated with each group. If a particular activity involves resources in different groups, then correlation of the charges in each group may also be needed to collect the charges associated to a particular activity.

A charging enabler 406 can provide an interface to charge for events. Such an interface may allow the charging of a certain amount to an account or other location. Such an interface also allows for a request that a certain event be rated and charged based on information about the event useful for rating. As for any other enabler, this charging enabler can be implemented with adapters having underlying network resources, such as a billing system (e.g. Amdocs) and/or a rating system. When a charge is generated via the charging enabler, the adapter can allow for the generation of a CDR/SDR in the billing system. If a rating is required, the adapter also can connect to the operator's rating system when generating the CDR. The charging enabler also can check the status of an account (e.g., good standing, balance), as well as whether that charge is successful or not. The charging enabler also can reserve amounts (e.g., for pre-paid) and commit or revert later. The charging enabler may be realized with a billing system or a payment system, such as a credit card, debit card, or payment systems like PayPal.

The charging enabler 406 can be configured to generate information about the purchase of the content, or service usage, from service layer 402. For example, the charging that may be generated can include the bill that is generated for the purchase of the content as well as any information for the download of the content. In the case of service charging, the charge may be the fee or price for usage as set by a subscriber plan or SLA with a third party.

The information typically provided by a charging enabler is not necessarily the information used for correlation. The charging enabler can collect, via its interface or from context additional information from a requester, information such as may include time stamps, identification of the content that was downloaded, the billed party, and other such information. The charging information, along with additional details collected by the charging enabler, can be passed to the billing system in the network layer 404 via an appropriate adapter. The charging enabler can be extended to collect meta information about the downloaded context or service used, which then can be used for correlation.

Any information may be relevant. At a minimum in one embodiment, the type of data to exchange, the time stamps of the requests, the duration or expected duration of the service, the address of origin and destinations, and the involved principals/actors and systems can be collected. At the same time, network resources 408 can be generating charging events that they pass to the billing system, which typically will involving a rating system. If possible, the information may be extended to add similar network level meta information. However, this is not mandatory, especially as operators typically do not like the idea of having to change anything to relating to their network charging and/or billing system(s).

A system in accordance with one embodiment can utilize a correlator 410 added ahead of the billing system, particularly where especially meta information cannot be passed via the billing system interface. In such case, requests can be collected from the systems and from charging enablers. The correlator 410 then can correlate the two sources of data, based on meta information, and can generate an SDR request that combines the service and network requests.

The correlator can maintain a cache or table of the correlation for a later request that may need to be appropriately matched as part of the same transaction or activity. If meta information can be passed, the billing system can generate or link the charges in the billing system. Requests to reserve, credit, or commit, for example, can similarly be handled by the correlator that identifies to what the combined CDR/SDR is to be referred, and generates the corresponding request. In existing systems, operators have to perform "after the fact" inspections of the bills to determine items to credit or otherwise process, and have to do that without the metadata required for accurate correlation. As a result, these items typically cannot be linked as part of the same transaction and a credit request has to be accepted if received. In some systems, a rejection is based solely upon the detection of a pattern of fraud.

It may be of value to allow for metadata collection at the level of the network resources that generate the billing for network usage, traffic, and/or events. This can be achieved in one embodiment with a smart router that catches and routes any traffic, and can associate, by inspecting all traffic, any traffic or data type, sender or receiver information, and/or time stamps. This information then can be passed to the correlator/billing system.

A smart router 408 can be configured to generate network information about the transmission of the content. A smart router 408 in this embodiment is an entity that can process and identify any traffic, including a determination of network and/or traffic information such as type of traffic (e.g., RTP, HTTP/HTML, etc.), origin, target, port, and/or type of content of packets. The smart router then can route the traffic accordingly, report in real or deferred time about the traffic passing through the smart router, and can allow for programming or router behavior. The network information may be gathered from routers that analyze the traffic. Also, other network information may include time stamps, ending download time, the nature of traffic, etc.

A correlator 410 can receive the network information and the correlation information from service layer 402, from a charging enabler 406, and can determine a charge that can be issued to a user. For example, the purchase of the content at the service layer 402 may be credited or the charge for the transmission of the content may be credited. Also, using the correlation, service layer correlator 410 can issue one transaction layer bill charge based on the correlation information from the service layer 402 and the network information from network layer 404. Thus, a user can receive one bill for the purchase and download of the content and credit can easily be applied.

Figure 5:
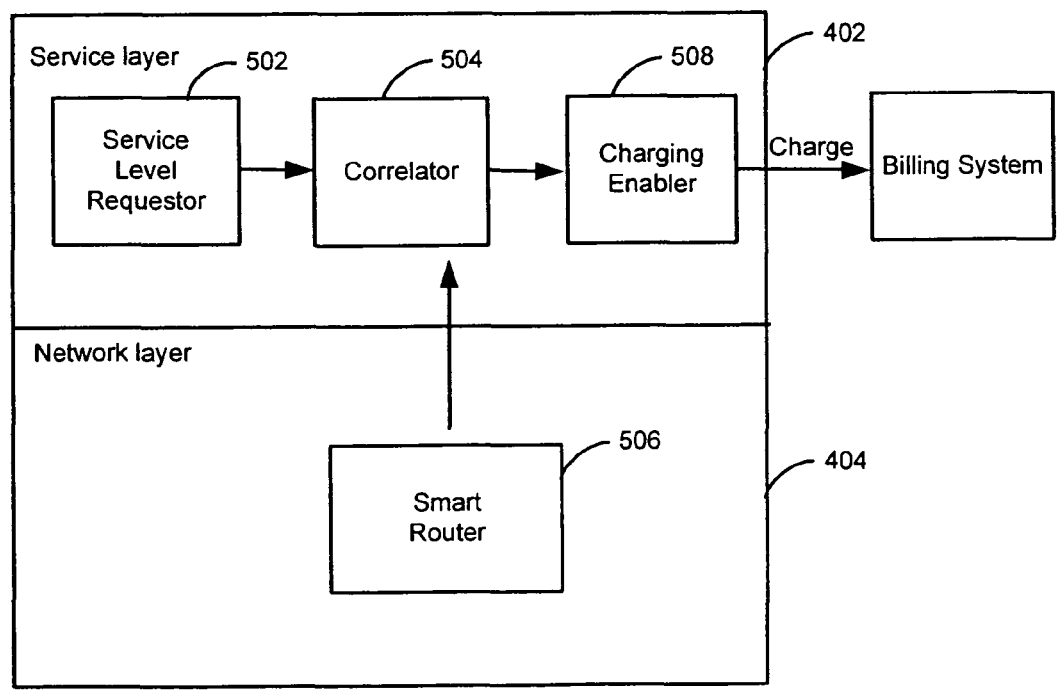
FIG. 5 depicts a system for correlating charges in a service layer according to one embodiment of the present invention.

FIG. 5 depicts an alternative approach and system 500 in accordance with another embodiment of the present invention for correlating charges in a service layer. As shown, a service layer 402 includes a service level requester 502 and a network layer smart router 506 that provides input to a correlator 504. The correlator 504 can generate a request into a charging enabler 508 that generates billing events into a billing system (in the network). In this embodiment, the correlation is performed in the service layer not in the network as in the previous example.

Smart router 506 (or network resources) can be configured to generate network information that can be used in the correlation by correlator 504. For example, the network information may be traditional CDR information complemented by metadata including time-stamps, end points of traffic for the requester, the identity of the requester of the content, transaction identity/session identity, the type of data exchange, etc. This information may be provided by the network resources or may be extracted using a smart router such as is discussed above for all traffic that is being downloaded. The charging information (such as CDR information) and any metadata then can be passed to service layer 402. In some embodiments it is not possible to change the network resource that generate the events for the billing system. However, a smart router can be added that processes all traffic, in order to perform functions such as generating CDR information, and getting metadata added via a smart router. A combiner or correlator may be used place in the network layer to combine the CDR information and metadata before passing on to the correlator 504. It may also happen that no such combination takes place, and the metadata and CDR information are passed separately to the correlator 504.

Eventually, under some circumstances, it may be possible that the CDR information is enough for the correlator 504 to correlate such that no smart router is needed. However this may only work in cases where correlation is unambiguous.

In one embodiment, the charge for downloading content or interacting with a service may not be charged at the network layer 404. Instead, the download of information may be charged at the service layer 402. In another embodiment, the charge may be performed in the network layer 404 but then may be adjusted in service layer 402, if the charge needs to be changed.

A service level requester 502 can generate service layer information that may be used in a correlation for service layer 402. This information can include, for example, content purchased, time of download of content, or service usage conditions. The service layer correlator 504 can receive the charging information, as well as any relevant metadata, and service layer information, and can correlate that information. A charge request to the charging enabler 508 can be generated that then can be passed to a billing system in the network.

In one embodiment the network traffic is charged in network layer 404, but when the correlation information is received at correlator 504, the information can be charged an appropriate rate based on the service layer information and the network correlation information. For example, if a download failed multiple times, these failed downloads may not be charged and only a charge for a proper download may be provided.

In one example, bill settlement may be provided between service provider and/or network operators. Operators compare traffic that the user incurs during roaming and the charges may be reconciled for the user over a period of time. One transaction charge may then be issued. Also, network operators may want to charge differently for traffic and services. In order to do so, the operators need to be able to associate traffic to services and perform settlement on the combined correlated charges. For example, X minutes of streamed content may be billed per traffic and possibly a revenue sharing on purchased content. Also, SMS, email, and instant messages may be billed based on the correlation, such that, for example, SMS may be billed per unit and not for traffic, email may be billed for traffic and not to units, and instant messages may be billed on the service and traffic beyond a given amount. Embodiments in accordance with the present invention may be used to bill these different services because the traffic is correlated with the service request and charges can be determined by a layer. Also, these charges may be reconciled as needed based on roaming agreements between network providers.

In another example, a user may be charged a first amount X for the content. Also, the user may be charged a Y amount for traffic on the network. If the charges for Y are per kilobyte, each kilobyte that is loaded can incur a charge. If the user has to try five times to download the information, where the content downloaded did not play or failed partially through the download, the user may be charged a certain amount for the failed downloads. Thus, it is desired that these charges when correlated with the content purchased should be reversed. For example, information for the purchased content may indicate that a certain charge should be charged for the content. If this charge is exceeded by the excess network charges, then the network charges may be credited.

Embodiments in accordance with the present invention provide many advantages. For example, multiple charges for something may be correlated and charged in one transaction. This eliminates the double billing of users and may eliminate complaints by users for the charges. Also, the correlation of charges allows for adjustments to the charges. This presents a charge to the user that does not double bill for something (e.g., the content itself and its delivery) and also allows for the adjustment of excess charges.

In one embodiment, call control or media control signaling from a service can drive traffic or signaling, such as SIP proxies or VoIP services. Media control signaling can take the form of an application, for example, executing call control via Parlay or an SIP servlet. In one embodiment, a smart router is used that counts traffic with this signaling, based on information such as target, receive, port(s), and type of data, and passes the traffic to the service layer for correlation. this traffic can include traffic in the transport layer as RTP, SRPC, or any other appropriate traffic. In another embodiment, signaling information is logged and passed as a call detail record (CDR) to a billing system in the service layer for later correlation and/or reconciliation.

Figure 6:
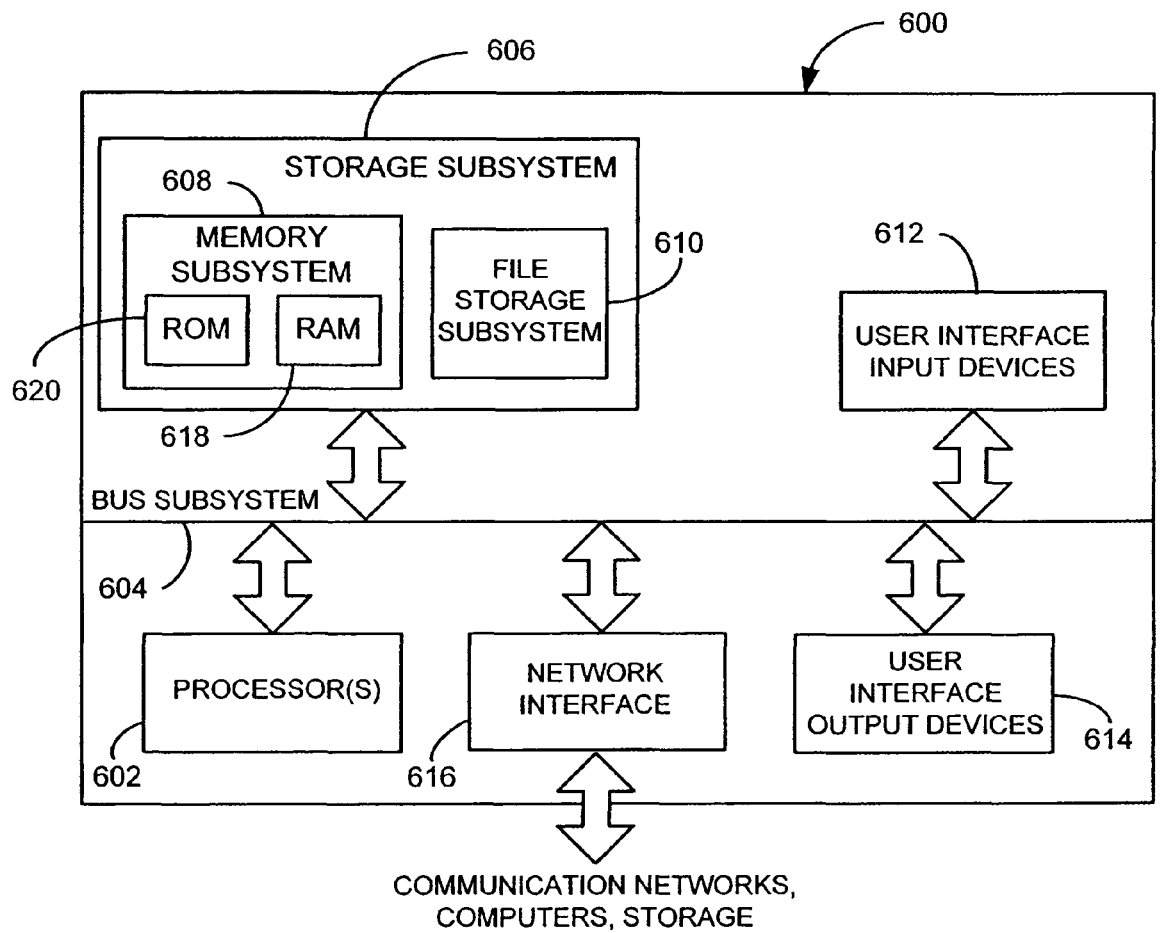
FIG. 6 is a simplified block diagram of data processing system that may be used to perform processing according to an embodiment of the present invention.

FIG. 6 is a simplified block diagram of data processing system 600 that may be used to perform processing according to an embodiment of the present invention. As shown in FIG. 6, data processing system 600 includes at least one processor 602, which communicates with a number of peripheral devices via a bus subsystem 604. These peripheral devices may include a storage subsystem 606, comprising a memory subsystem 608 and a file storage subsystem 610, user interface input devices 612, user interface output devices 614, and a network interface subsystem 616. The input and output devices allow user interaction with data processing system 602.

Network interface subsystem 616 provides an interface to other computer systems, networks, and storage resources. The networks may include the Internet, a local area network (LAN), a wide area network (WAN), a wireless network, an intranet, a private network, a public network, a switched network, or any other suitable communication network. Network interface subsystem 616 serves as an interface for receiving data from other sources and for transmitting data to other sources from data processing system 600. Embodiments of network interface subsystem 616 include an Ethernet card, a modem (telephone, satellite, cable, ISDN, etc.), (asynchronous) digital subscriber line (DSL) units, and the like.

User interface input devices 612 may include a keyboard, pointing devices such as a mouse, trackball, touchpad, or graphics tablet, a scanner, a barcode scanner, a touchscreen incorporated into the display, audio input devices such as voice recognition systems, microphones, and other types of input devices. In general, use of the term "input device" is intended to include all possible types of devices and ways to input information to data processing system 600.

User interface output devices 614 may include a display subsystem, a printer, a fax machine, or non-visual displays such as audio output devices. The display subsystem may be a cathode ray tube (CRT), a flat-panel device such as a liquid crystal display (LCD), or a projection device. In general, use of the term "output device" is intended to include all possible types of devices and ways to output information from data processing system 600.

Storage subsystem 606 may be configured to store the basic programming and data constructs that provide the functionality of the present invention. For example, according to an embodiment of the present invention, software modules implementing the functionality of the present invention may be stored in storage subsystem 606. These software modules may be executed by processor(s) 602. Storage subsystem 606 may also provide a repository for storing data used in accordance with the present invention. Storage subsystem 606 may comprise memory subsystem 608 and file/disk storage subsystem 610.

Memory subsystem 608 may include a number of memories including a main random access memory (RAM) 618 for storage of instructions and data during program execution and a read only memory (ROM) 620 in which fixed instructions are stored. File storage subsystem 610 provides persistent (non-volatile) storage for program and data files, and may include a hard disk drive, a floppy disk drive along with associated removable media, a Compact Disk Read Only Memory (CD-ROM) drive, an optical drive, removable media cartridges, and other like storage media.

Bus subsystem 604 provides a mechanism for letting the various components and subsystems of data processing system 602 communicate with each other as intended. Although bus subsystem 604 is shown schematically as a single bus, alternative embodiments of the bus subsystem may utilize multiple busses.

Data processing system 600 can be of varying types including a personal computer, a portable computer, a workstation, a network computer, a mainframe, a kiosk, or any other data processing system. Due to the ever-changing nature of computers and networks, the description of data processing system 600 depicted in FIG. 6 is intended only as a specific example for purposes of illustrating the preferred embodiment of the computer system. Many other configurations having more or fewer components than the system depicted in FIG. 6 are possible.

The present invention can be implemented in the form of control logic in software or hardware or a combination of both. The control logic may be stored in an information storage medium as a plurality of instructions adapted to direct an information-processing device to perform a set of steps disclosed in embodiments of the present invention. Based on the disclosure and teachings provided herein, a person of ordinary skill in the art will appreciate other ways and/or methods to implement the present invention.

The above description is illustrative but not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

What is claimed is:

1. A non-transitory machine-readable medium having sets of instructions stored thereon which, when executed by a machine, cause that machine perform the steps of:
   determining first charging information for a service based on a request for content or a service, wherein the content or service is rendered on a client device;
   determining second charging information for a network layer based on transmission related to the requested service or content, wherein the transmission is over a network medium;
   determining metadata for the service and the network layer;
   based on the metadata for the service and the network layer, sending from a network layer smart router to a correlator a request into a charging enabler to generate billing events for a billing system, wherein the billing events are associated with the first charging information and the second charging information;
   correlating, at the correlator, the billing events, the metadata for the service, the metadata for the network layer, the first charging information, and second charging information;
   based on the correlation, generating a single charge for an overall transaction, the overall transaction including activity at the service and the network layer, wherein the single charge for the overall transaction is configured to provide non-duplicative charging of both the service or content and the transmission of traffic used to download the service or content;
   determining that the request for content or a service is associated with a download error, wherein:
      downloading the content or service was comprised of a first download session and a second download session, wherein:
         the first download session is associated with a first network layer charge; and
         the second download session is associated with a second network layer charge;
         the first download session did not result in downloading the content or service functional for its intended purpose; and
         the second download session resulted in downloading the content or service functional for its intended purpose;
   adjusting a charge generated for the service and a charge generated for the network layer based on the correlation information and in response to at least one charging overlap between the service charges and the network layer charges, wherein the overlap comprises at least one charge for the requested service or content and a charge for the transmission over the network medium; and
   adjusting the charge generated for the network layer based on the correlation information, wherein the at least a portion of the first network layer charge is adjusted based on the determination that the first download session did not result in downloading the content or service functional for its intended purpose.

2. The non-transitory machine-readable medium of claim 1, wherein the single charge is generated for the content purchased and the transmission of the content.

3. The non-transitory machine-readable medium of claim 1, wherein the single charge is generated for the service purchased and transmission related to the service.

4. The non-transitory machine-readable medium of claim 1, wherein at least one of the first charging information and the second charging information is changed based on the correlation.

5. The non-transitory machine-readable medium of claim 1, wherein the first download session failed to completely download the content or service.

6. The non-transitory machine-readable medium of claim 1, wherein the first download session downloaded unplayable content.

7. The non-transitory machine-readable medium of claim 1, wherein the first download session downloaded unrequested content or services.

8. A non-transitory machine-readable medium having sets of instructions stored thereon which, when executed by a machine, cause that machine perform the steps of:
   receiving first charging information and associated first metadata from a service based on a request for content or a service;
   determining second charging information and associated second metadata for the network layer based on transmission for the requested content or service through the network layer; and
   based on the metadata for the service and the network layer, sending from a network layer smart router to a correlator a request into a charging enabler to generate billing events for a billing system, wherein the billing events are associated with the first charging information and the second charging information;
   correlating, at the correlator, the billing events, the first charging information and the associated first metadata with the second charging information and the associated second metadata;
   based on the correlation, generating a single total charge for the request for content or a service and the transmission for the content or service based on the results of the correlating step, wherein the single charge for the overall transaction is configured to provide non-duplicative charging of both the service or content and the transmission of traffic used to download the service or content;
   determining that the request for content or a service is associated with a download error, wherein:
      downloading the content or service was comprised of a first download session and a second download session, wherein:
         the first download session is associated with a first network layer charge; and the second download session is associated with a second network layer charge;

the first download session did not result in downloading the content or service functional for its intended purpose; and the second download session resulted in downloading the content or service functional for its intended purpose;

adjusting a charge generated for the service and a charge generated for the network layer in response to at least one charging overlap between the service charges and the network layer charges, wherein the overlap comprises at least one charge for the requested service or content and a charge for the transmission over the network layer; and adjusting the charge generated for the network layer based on the correlation information, wherein the at least a portion of the first network layer charge is adjusted based on the determination that the first download session did not result in downloading the content or service functional for its intended purpose.

9. The non-transitory machine-readable medium of claim 8, wherein the single total charge is generated by a network billing system.

10. The non-transitory machine-readable medium of claim 8, wherein the generated single total charge is generated to cover a first charge for the purchase of the content or service and a second charge for the transmission related to the content or service.

11. The non-transitory machine-readable medium of claim 8, wherein the service is associated with a first entity and the network layer is associated with a second entity different from the first entity.

12. The non-transitory machine-readable medium of claim 8, wherein the generating of a single total charge includes using at least one of a payment system and a billing system.

13. The non-transitory machine-readable medium of claim 8, wherein the step of generating a single total charge supports payment models selected from the group consisting of pre-paid and post-paid payment models.

14. A non-transitory computer program product embedded in a computer readable medium, comprising:

computer program code for determining first charging information for a service based on a request for content or a service;

computer program code for determining second charging information for a network layer based on transmission related to the requested service or content; and computer program code for determining metadata for the service and the network layer;

based on the metadata for the service and the network layer, computer program code for sending from a network layer smart router to a correlator a request into a charging enabler to generate billing events for a billing system, wherein the billing events are associated with the first charging information and the second charging information, wherein the single charge for the overall transaction is configured to provide non-duplicative charging of both the service or content and the transmission of traffic used to download the service or content; and computer program code for correlating at the correlator, the billing events, the metadata for the service, the metadata for the network layer, the first charging information and second charging information;

based on the correlation, computer program code for generating a single charge for an overall transaction, the overall transaction including activity of the service and at the network layer;

computer code for determining that the request for content or a service is associated with a download error, wherein:

downloading the content or service was comprised of a first download session and a second download session, wherein:

the first download session is associated with a first network layer charge; and the second download session is associated with a second network layer charge;

the first download session did not result in downloading the content or service functional for its intended purpose; and the second download session resulted in downloading the content or service functional for its intended purpose;

computer program code for adjusting a charge generated for the service and a charge generated for the network layer based on the correlation information and in response to at least one charging overlap between the service charges and the network layer charges, wherein the overlap comprises at least one charge for the requested service or content and a charge for the transmission over the network layer; and computer program code for adjusting the charge generated for the network layer based on the correlation information, wherein the at least a portion of the first network layer charge is adjusted based on the determination that the first download session did not result in downloading the content or service functional for its intended purpose.

* * * * *

UNITED STATES PATENT AND TRADEMARK OFFICE
CERTIFICATE OF CORRECTION

| | | |
|---|---|---|
| PATENT NO. | : 8,560,463 B2 | Page 1 of 1 |
| APPLICATION NO. | : 11/475280 | |
| DATED | : October 15, 2013 | |
| INVENTOR(S) | : Maes | |

It is certified that error appears in the above-identified patent and that said Letters Patent is hereby corrected as shown below:

On the title page
On page 2, column 2, Item [56] under "other publications", line 13-14, delete "Standard" and insert
-- Standards --, therefor.

Signed and Sealed this
Third Day of June, 2014

Michelle K. Lee
*Deputy Director of the United States Patent and Trademark Office*